United States Patent Office 3,112,128
Patented Nov. 26, 1963

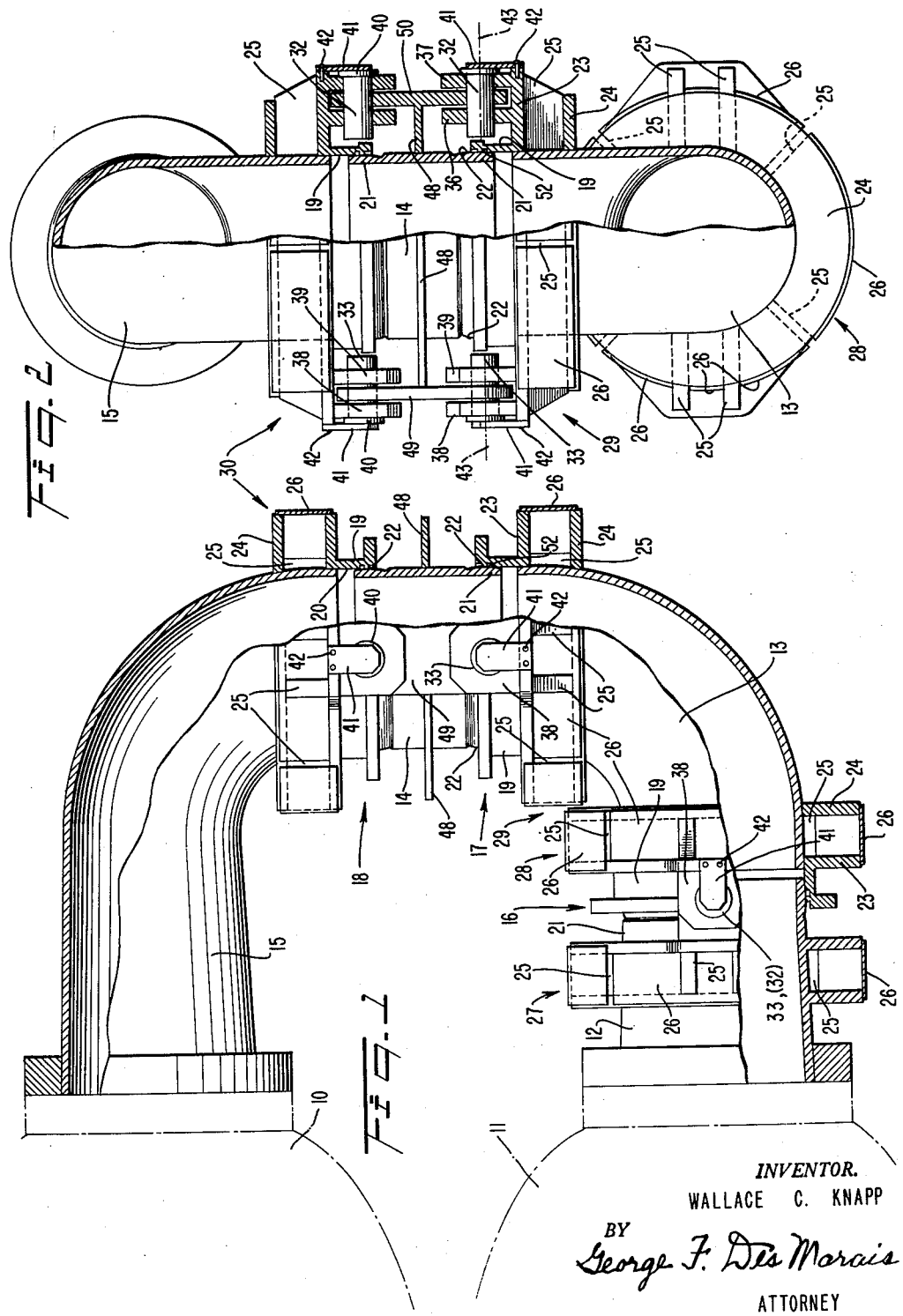

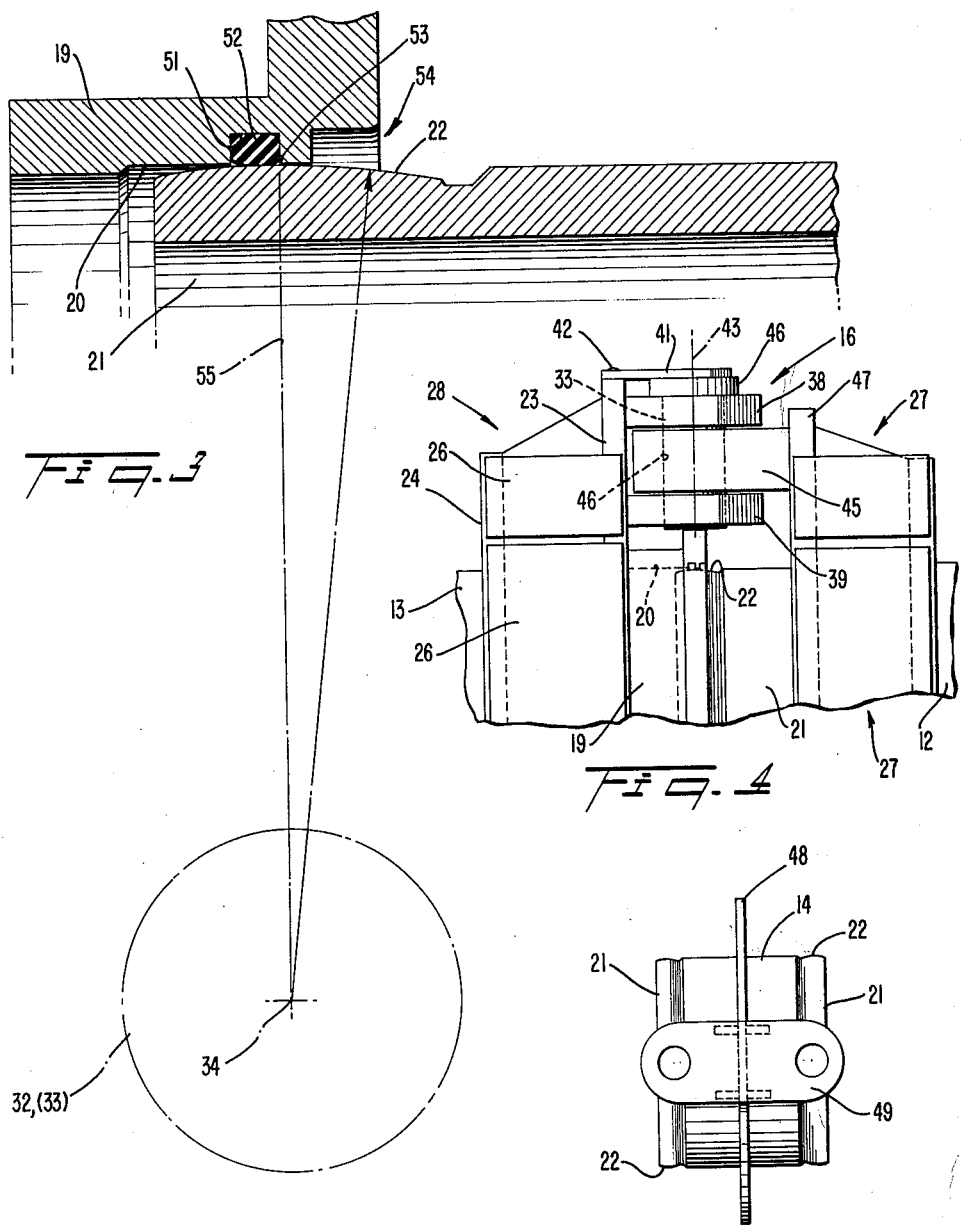

3,112,128
HINGED JOINTS FOR COUPLING PIPE SECTIONS
Wallace C. Knapp, Drexel Hill, Pa., assignor to C. H. Wheeler Manufacturing Company, Philadelphia, Pa., a corporation of Pennsylvania
Filed June 20, 1960, Ser. No. 37,155
4 Claims. (Cl. 285—166)

This invention relates to hinged joints for coupling pipe sections in pipe lines employed for conducting fluids at high pressures. The invention is particularly suited for providing flexibility of movement between coupled sections of a pipe line through which heated fluids are conducted between units, and in which the pipe sections are subject to movement under varying conditions of temperature.

Among the objects of the invention is to provide hinged joints capable of withstanding the high pressures currently used in steam generating installations without leakage, irrespective of change in the angularity of the axes of joined pipe sections.

A further object is to provide a flexible joint structure capable of transmitting and sustaining axial thrust along a pipe line and of sustaining severe shocks without deleteriously affecting the sealing quality of a joint.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompaning drawing, in which:

FIG. 1 is a plan, partly in section, showing several joints employing the invention;

FIG. 2 is an end view of the pipe line shown in FIG. 1, with parts broken away on a plane through the axis of an intermediate pipe section;

FIG. 3 is an enlarged longitudinal section showing portions of the sealing elements of joined pipe sections;

FIG. 4 is an elevation of a portion of the exterior of a hinged joint; and

FIG. 5 illustrates the exterior of a pipe section or sleeve having a spherical surface at each end.

In FIGS. 1 and 2, there is shown a looped pipe line connecting with headers of separate units 10 and 11. These units may be operating at the same or at different temperatures and in either case the connecting pipe line is subject to movement due to expansion and contraction whenever a change in temperature occurs. The pipe line illustrated includes a pipe section 12 connected to the unit 11, a pipe section 13 in the form of an elbow or bend, an intermediate pipe section or sleeve 14 and another pipe section 15 which bends and connects with the unit 10. The pipe line shown includes three flexible joints, generally indicated at 16, 17 and 18, which enable the coupled pipe sections to swing with respect to one another. As shown in FIG. 1, the several joints are so oriented as to permit pivotal movement on axes perpendicular to the plane of the paper. The sealing features of these joints are similar, and it will be understood that the joints may be provided in any number required to accomplish the flexibility desired in pipe lines subject to different operating characteristics.

Each joint includes a socket member 19 having a cylindrical bore 20 and a spigot member 21 received in the bore of the socket member and having a spherical surface 22 whose radius is slightly less than the radius of the cylindrical bore. Like reference characters denote like parts of the several joints.

The pipe section 13, FIGS. 1 and 2, is provided with a socket member 19 at each end which is welded to the pipe section, or may be constituted as an extension from the face of a flange 23 which is firmly secured to the pipe section. Each socket member of the several sections serves as a continuation of the conduit provided by the respective pipe section.

Each flange 23 is part of a frame which includes a ring 24 and a plurality of ribs 25 distributed at intervals around a pipe section and extending radially therefrom. The ribs are welded to a pipe section and are welded to the flange 23 and the ring 24. A plurality of curvilinear plates 26 are welded to the outer edges of the flange 23 and of the ring 24 to provide a rigid box-like structure. This structure encircles the pipe section and distributes the thrust or pressure load on a joint entirely around the pipe section without setting up bending stresses in the pipe section. All of the frames indicated at 27, 28, 29 and 30 are similarly constructed and fixed to their respective sections. The frame 27 is mounted on a spigot member and the frames 28, 29 and 30 are mounted on socket members of different sections.

Each joint includes a pair of hinge pins 32, 33, which are located opposite one another at opposite sides of each joint with their centerlines located on a common axis passing through the center of curvature of the spherical surface 22 of the spigot member, as indicated at 34 in FIG. 3. The centerlines of the hinge pins of a joint also lie in a plane normal to the axis of the cylindrical bore 20 of the socket member, as shown in FIGS. 2 and 4. The hinge pins are maintained in the aforesaid relationship by journal blocks which are secured, respectively, to the socket member and to the spigot member of each joint. Axial thrust is communicated from one pipe section to another through the hinge pins.

As shown in FIG. 2, the journal blocks 36 and 37 for the pin 32 of the joint 17 are rigidly secured to the flange 23 of the box-frame 29 and these journal blocks support the pin 32 in alignment with the pin 33 which is journalled in journal blocks 38 and 39, which are also secured to the box-frame 29. The various journal blocks may be in the form of lugs, suitably bored and forming integral parts of a flange or of another part of a pipe section. The pins are restrained from axial displacement in the journal blocks by their heads 40 and by plates 41 which are fastened by bolts 42 to the flanges 23 of the stiffening frames 28, 29 and 30.

Each pair of aligned hinge pins 32 and 33 is precisely maintained centered at all times on a common axis which is fixed with reference to the spigot member 21. The centerline 43 of a pair of pins, as best seen in FIG. 4 with respect to the joint 16, intersects the spherical surface 22 at approximately the mid-point of a ball segment.

The spigot member 21 of the joint 16 is provided with a journal block 45 for the pin 33. A similar journal block (not shown) is located on the spigot member of the joint 16 diametrically opposite from the journal block 45 for supporting the other aligned hinge pin 32 (FIG. 1). These journal blocks may be formed as lugs fixed to the box-frame 27 of the pipe section 12. The bearings provided in the blocks fix the location of the axis of the hinge pins with reference to the spigot member of the pipe section 12.

The relationship of the hinge pins 32 and 33 of the respective joints 17 and 18 is illustrated in FIGS. 1 and 2. These joints are located, respectively, adjacent each end of an intermediate pipe section or sleeve 14. Each end is exteriorly finished with a spherical surface 22. The pipe section 14 is encircled by a flange 48 which is welded thereto and reinforced by gussets.

Longitudinally extending links 49 and 50 are welded to the flange 48 at diametrically opposite locations on the flange. The link 49 provides the journal blocks for the respective pins 33 of the joints 17 and 18, respectively, and the link 50 provides journal blocks for the respective pins 32 of the joints 17 and 18, respectively. The links relieve the intermediate pipe section 14 of all axial thrust due to pressure load.

The bores which provide the bearings for the respective pairs of pins are so located in the links 49 and 50 as to have the centerline of each pair of pins 32, 33, pass through the center of curvature of the spherical surface 22 of the respective joints and intersect the segments of the spherical surfaces in the general vicinity of mid-points thereof in the longitudinal direction of the pipe section 14.

Each of the socket members 19 contains an annular groove 51 for containing an O-ring 52, as best seen in FIG. 3. The O-ring may be formed from rubber or of any suitable rubber-like material. A groove is located in the surface of each cylindrical bore 20 with the edge 53 of the groove, which is nearest the mouth 54 or the outside of the socket member, intersecting the cylindrical surface of the bore in a plane normal to the axis of the bore and containing the center of curvature of the spherical surface 22 of a joined spigot member. The plane described by the edge 53 is indicated by the line 55 in FIG. 3.

Pivotal movement of one joint member relatively to another occurs only about the axis of the hinge pins 32, 33, of coupled members of each of the joints 16, 17 and 18 which, as explained hereinabove, is located to intersect diametrically opposite points on the circle described by the edge 53 of the gasket-confining groove. The spherical surface 22 and the cylindrical surface 20 are machined to provide a minimum of clearance between the two sealing surfaces at the circular edge 53. As a result, extrusion of sealing means from the groove is prevented even at very high pressures.

For a socket member having a cylindrical bore machined to a diameter of 12 inches, a clearance of the order of about 0.002 of an inch serves to maintain the seal of the joint against high pressures of working fluids ranging upwardly to 5,000 pounds per square inch.

High pressure fluids exert a tremendous thrust axially of a joint in a pipe line having a loop. As an example, for a cylindrical bore machined to a diameter of 12 inches and subjected to a pressure of 2,000 pounds per square inch, an axial thrust of about 226,000 pounds exists. The supporting means for the hinge pins, including the frames 27, 28, 29 and 30, are so constructed as to have sufficient strength to distribute the pressure load around the respective pipe sections and thereby avoid bending stresses in the pipe sections which otherwise would tend to impair the accuracy of the locations of the centerlines of the hinge pins, or affect the trueness of the circularity of the coupled joint members to the extent of permitting leakage.

The joint structure of the present invention is well suited to contain large shock loads to which equipment on shipboard is subjected by the firing of guns or of other armament. As units in a pipeline, the joints function effectively notwithstanding the effect of instantaneous accelerations of the order of thirty G's caused by explosions, as when armament is fired.

While I have shown a preferred form of the invention, various modifications, alterations and substitutions will be obvious to those skilled in the art after a study of the foregoing description. Consequently, the disclosure is to be considered as illustrative, and it is my desire and intention to reserve all modifications and substitutions falling within the scope of the claims which follow.

What is claimed is:

1. In a hinged joint for coupling pipe sections, the combination comprising a spigot member carried by a first pipe section, said spigot member having an outer spherical surface, a socket member carried by a second pipe section, said socket member having an inner cylindrical surface with a diameter slightly greater than the diameter of said outer spherical surface of said spigot member, an annular groove in said inner cylindrical surface of said socket member, said groove having edges opposite one another at said inner cylindrical surface of said socket member, hinge joints at diametrically opposite sides of said sections for limiting movement between said first and said second sections to pivotal movement about a single axis, said joints having axially aligned hinge pins, a first bearing means for said hinge pins rigidly fixed to the periphery of said first pipe section for supporting said hinge pins on a common pivotal axis passing through the center of curvature of said spherical surface, said common pivotal axis coinciding with said single axis, a second bearing means for said hinge pins rigidly fixed to the periphery of said second pipe section, both of said bearing means having such close tolerance fits with said pins as to eliminate movement of each of said pipe sections in relation to the other in directions normal to the axis of said hinge pins, said annular groove being so disposed in said socket member that the plane of the one of said opposite edges of said groove closest to the mouth of said socket member always contains said axis of said hinge pins irrespective of pivotal movement of said pipe sections on said hinge pins, and a resilient O-ring in said groove for sealing between said spherical member and said socket member.

2. The combination defined in claim 1 in which said first bearing means includes a circular supporting frame encircling and integrally attached to the first pipe section, and said second bearing means includes a circular supporting frame encircling and integrally attached to the second pipe section.

3. A sealing coupling between pipe sections comprising a socket member having a cylindrical bore, a second socket member having a cylindrical bore, a pipe section intermediate said socket members, said pipe section having a spherical surface received in the bore of said first socket member and a spherical surface received in the bore of said second socket member, said spherical surfaces having a diameter slightly less than the diameter of said cylindrical bores, a pair of hinge pins mounted adjacent each end of said section, the pins of each pair being axially aligned and located opposite one another on a common axis, means mounted to said section and maintaining the respective pairs of said pins immovably fixed in relation to said section on respective axes passing through the center of curvature of the respective spherical surfaces of said section, means carried by said first socket member and supporting one of said pairs of pins immovably fixed in relation to said first socket member on an axis normal to the axis of the cylindrical bore of said first socket member, means carried by said second socket member and supporting the other of said pairs of pins immovably fixed in relation to said second socket member on an axis normal to the axis of the cylindrical bore of said second socket member, whereby relative movement between said socket members and said section is constrained to only pivotal movements about said pairs of hinge pins, an annular groove in the inner cylindrical surface of the bore of each of said socket members, each of said grooves being so disposed that the edge thereof which is nearest the mouth of its associated socket member is always disposed in a plane which contains the center of curvature of the spherical surface received in the cylindrical bore containing the groove irrespective of different angular positions of deflection between a socket member and said pipe section about a pair of said hinge pins, and sealing means in said grooves, said sealing means consisting of elastomeric pressure-self sealing O-rings.

4. The invention set forth in claim 3 in which said means mounted to said pipe section comprise a flange secured to said pipe section and a pair of links attached to said flange, each link having a bearing adjacent one end in which a hinge pin of one of said pairs of pins is journalled and another bearing adjacent its other end in which a hinge pin of the other of said pairs of pins is journalled.

References Cited in the file of this patent

UNITED STATES PATENTS

| | | |
|---|---|---|
| 649,303 | Harter | May 8, 1900 |
| 1,700,311 | Fender | Jan. 29, 1929 |
| 2,034,637 | Mooney | Mar. 17, 1936 |
| 2,551,550 | Smith | May 1, 1951 |
| 2,971,701 | Shames | Feb. 14, 1961 |

FOREIGN PATENTS

| | | |
|---|---|---|
| 22,253 | Great Britain | Sept. 30, 1909 |
| 16,240 | Great Britain | Jan. 29, 1914 |
| 516,337 | Germany | Jan. 22, 1931 |